Nov. 1, 1966 W. A. SMITH 3,282,105
METHOD AND MEANS FOR MEASURING DEGREE DAYS
Filed July 22, 1963 2 Sheets-Sheet 1

INVENTOR
WILLIAM A. SMITH
BY Donald H. Zarley
ATTORNEY

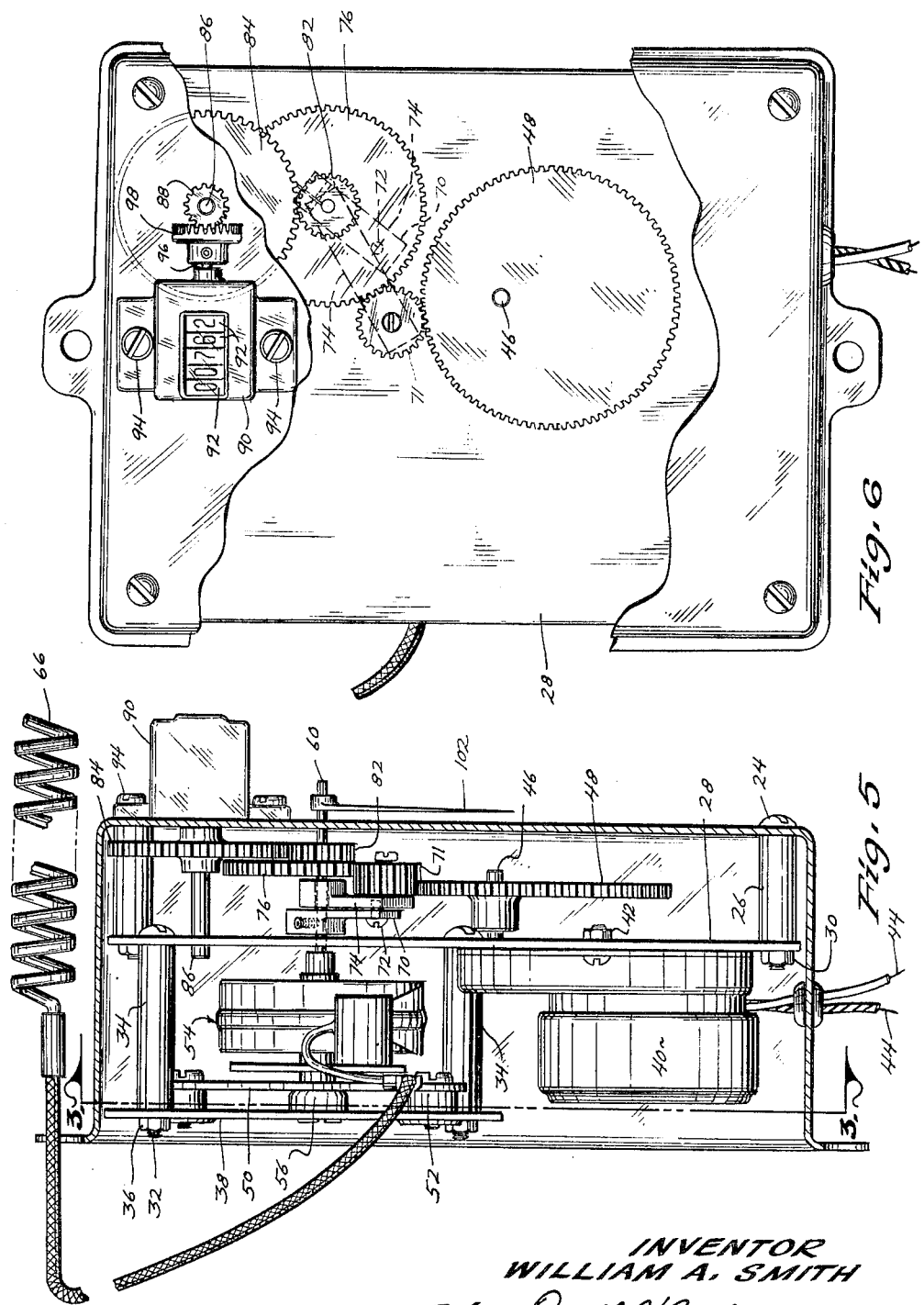

United States Patent Office 3,282,105
Patented Nov. 1, 1966

3,282,105
METHOD AND MEANS FOR MEASURING
DEGREE DAYS
William A. Smith, Rte. 3, Newton, Iowa
Filed July 22, 1963, Ser. No. 296,591
7 Claims. (Cl. 73—339)

"Degree-days" generally refer to the difference between 65° F. and the mean temperature for a given twenty-four hour period, when the mean temperature is below 65° F. Thus, when the degree-days measure "20," the mean temperature for the twenty-four hour period measured was 45° F. The degree day is then used to calculate fuel consumption and to measure heating efficiency of a given structure. Fuel consumption can be computed according to the following formula when the degree days are known:

$$F = UNDC_t$$

where

F is the fuel consumption for a given period;
U is the unit or "factor" of fuel consumption or quantity of fuel per degree day;
N is the B.t.u./hour heat loss of a building at a 70° temperature difference;
D is the number of degree days for the estimated period; and
$C_t$ is the temperature correction factor for temperature differences.

The product of U and N can be easily calculated for a given building by measuring the actual fuel consumed over a given period. Thus, with the values of F, D and $C_t$ being known, $$UN = F/DC_t$$

This factor will remain the same for any given building, so the amount of fuel being consumed can be easily computed thereafter by ascertaining the value of D (degree days) from a device such as the one herein contemplated, and multiplying it by the then known values of UN and $C_t$. Similarly, the efficiency of the heating of a given unit can be determined by computing F in the manner described and actually measuring the value of F at the fuel tank. If the two values differ greatly, the efficiency of the heating plant should be checked.

The degree-days have many useful applications in bulk oil distributing plants, commercial buildings and even homes. However, the great cost of available equipment to measure degree days has greatly hampered and discouraged the use of this valuable information.

Therefore, a principal object of this invention is to provide a degree-day measuring unit which is economical of manufacture.

A further object of this invention is to provide a method and means for measuring degree days that are accurate in continuously measuring degree days.

A still further object of this invention is to provide a method and means for measuring degree days that are capable of measuring quantums of cold as well as heat.

A still further object of this invention is to provide a method and means for measuring degree days that will be substantially free of maintenance.

A still further object of this invention is to provide a method and means for measuring degree days that can be easily installed.

These and other objects, and other features and advantages of this invention will become readily apparent upon reference to the following description when taken in conjunction with the accompanying drawings, in which:

FIGURE 5 is a vertical sectional view taken at right angles to the view in FIGURE 3; and FIGURE 6 is a view similar to that of FIGURE 4 but shows the driving mechanism in a different phase of its operation.

Figure 1:
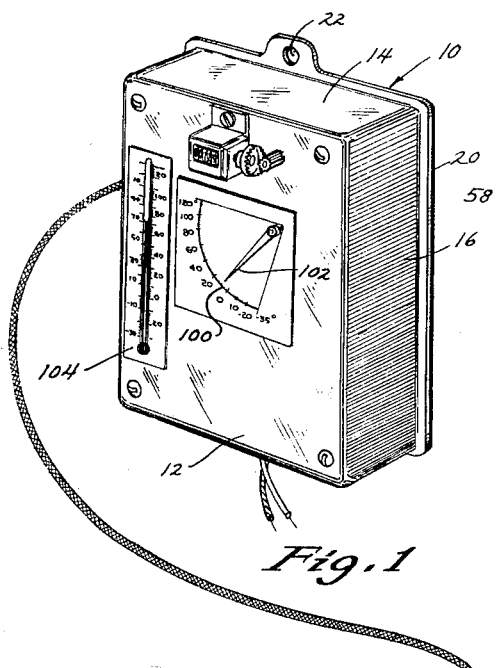
FIGURE 1 is a perspective view of the device of this invention prior to installation.
Figure 3:
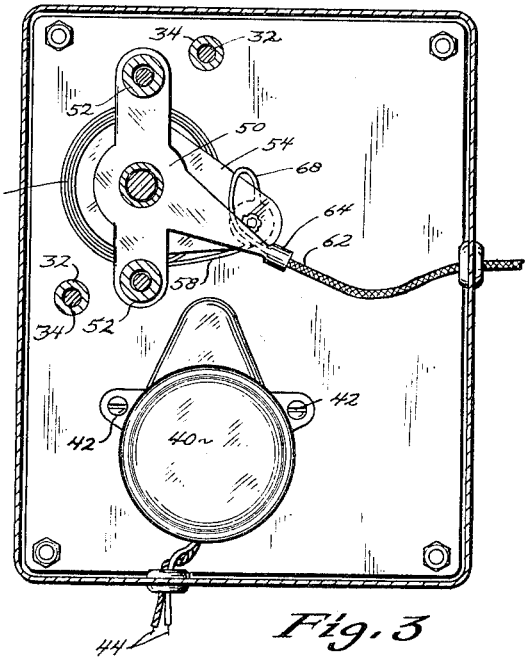
FIGURE 3 is a sectional view of the degree day measuring unit taken on line 3—3 of FIGURE 5 and illustrating the motor unit and Bourdon tube.

A "pan-shaped" housing 10 has a front portion 12, top portion 14, side portions 16, bottom portion 18, and a flange 20 that extends around the open rearward portion thereof. Apertures 22 in flange 20 facilitate the mounting of the housing 10 on a wall unit in conjunction with screws or the like.

Bolts 24 extend through the front portion of the housing into the interior thereof to extend through sleeves 26 and suitable apertures in plate 28. Nuts 30 on the ends of bolts 24 bind the plate 28 against the sleeves to maintain the plate in parallel position with respect to the front portion of the housing. Bolts 32, sleeves 34, and nuts 36 similarly act to secure plate 38 in a parallel position with respect to plate 28, as shown in FIGURE 5.

A synchronous motor 40 is mounted on the lower rearward portion of plate 28 by connectors 42, and is connected to a source of electicity by leads 44 which extend through the bottom 18 of housing 10. The drive shaft 46 of motor 40 rotatably extends through a suitable opening in plate 28 and is adapted to make two complete revolutions per hour when the motor is electrically excited. A drive gear 48 is eccentrically and rigidly mounted on shaft 46 and has 100 teeth on its periphery—one tooth for each degree between 65° F. and —35° F., the temperature range through which degree days are normally calculated.

A bracket 50 is suspended forwardly of plate 38 by connectors 52 and a Bourdon tube 54 is mounted in conventional fashion on a bearing means 56 which extends forwardly from the plate 38 and through the bracket. The spiraled coils 58 of the Bourdon tube are operatively connected to the shaft 60 which extends through the bearing means 56 so that expansion and contraction of the coils will effect rotation of shaft 60 in convenient fashion. The end of an elongated hollow cable shield 62 is rigidly secured to bracket 50 at 64, and the cable shield extends through the housing 10 and is connected to a sensing coil 66. An extension 68 of the coils 58 of the Bourdon tube extends from operative communication therewith through the cable shield 62 and sensing coil 66. The coils 58 and coil extension 68 are filled with a suitable gas, and when changes of temperature are imposed on sensing coil 66, the gas in the coil elements either expands or contracts and causes a corresponding physical expansion or contraction in the coils 58. This causes a corresponding rotation of the shaft 60 which is operatively secured to coils 58. The above described structure is that of a conventional capillary actuated Bourdon tube.

Shaft 60 rotatably extends forwardly from the Bourdon tube through plate 28 and the front portion 12 of housing 10. An arm 70 is rigidly secured to shaft 60 just forwardly of plate 28, and as top screw 72 extends forwardly from the free end thereof. An idler arm 74 is rotatably mounted on shaft 60 just forwardly of arm 70, and an idler gear 71 having twenty-four teeth on its periphery is rotatably mounted on the forward side of the free end thereof. A counter drive gear 76 with preferably 80 gear teeth on its periphery is rotatably mounted on shaft 60 and is always in mesh with the teeth of idler gear 71. A reducing counter drive gear 82 is rigidly fixed to and concentrically positioned on the forward face of gear 76, and preferably has twenty-four teeth on its outer periphery. The teeth of gear 82 are in constant mesh with a second counter drive gear 84 which is fixedly secured to shaft 86 which is rotatably mounted on and extending between plate 28 and the front portions 12 of housing 10. Gear 84 preferably has seventy-two teeth on its outer perimeter. A counter drive pinion gear 88 is rigidly secured to the outer end of shaft 86 at a point forwardly of housing 10. Gear 88 has fifteen teeth on its outer periphery. A tumbler type counting mechanism 90 of conventional construction with numbered tumblers 92 is secured to the front of housing 10 by screws 94. A conventional power shaft 96 extends laterally therefrom and a crown gear 98 with thirty teeth thereon is rigidly secured to the free end thereof and is in meshed engagement with the teeth of gear 88. Obviously, the ratio of teeth on the above described gears may be changed without substantially departing from this invention, but the ratios described are satisfactory and do achieve desirable results.

The Bourdon tube 54 is designed to rotate shaft 60 through an arc of about 78 degrees as the temperature sensed by coil 66 varies between 65° F. and a —35° F. An arcuate scale 100 on the front of housing 10 is concentrically positioned with shaft 60 and pointer 102 is rigidly secured to the end of the shaft and is adapted to point to the sensed temperature on the scale. A thermometer 104 on the housing will reflect the room temperature.

Figure 2:
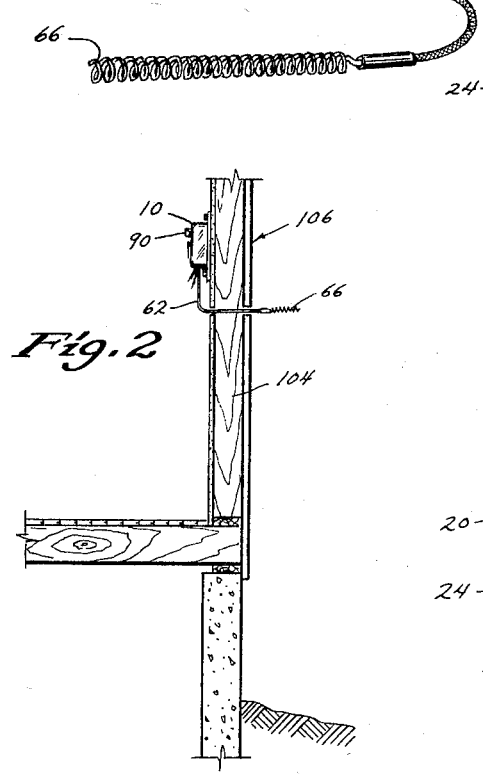
FIGURE 2 is a cross-sectional view taken through the wall of a building upon which the device of this invention is mounted.
Figure 4:
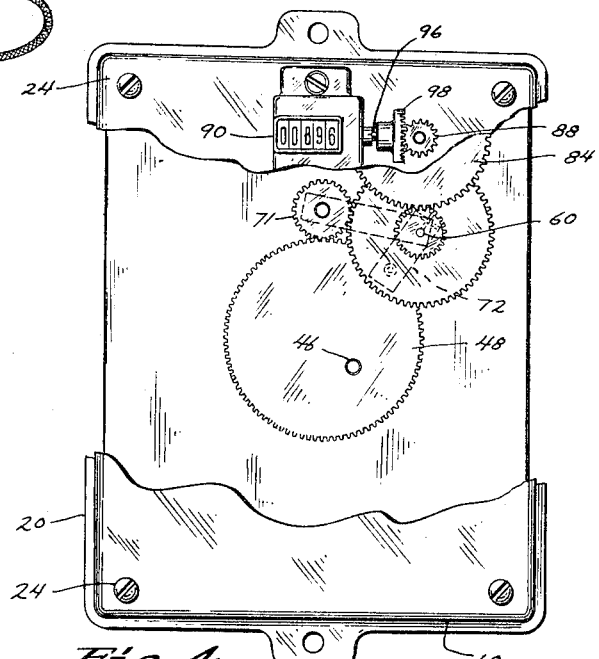
FIGURE 4 is a front elevational view of the measuring unit with portions of the front casing cut away to more fully illustrate the construction of the driving mechanism.

The normal operation of this device is as follows: The position of arm 74 is determined by the Bourdon tube as it senses the outside temperature when the unit is installed as shown in FIGURE 2. There the housing is mounted on the interior side of a wall 104 of building 106 and coil 66 extends through the wall to the outside atmosphere. At a —35° F., the arm 74 would be dropped to its lowest position and idler gear 71 would be in meshed engagement with drive gear 48 even when it was in its lower most eccentric position. See this relationship shown in FIGURE 6. As the eccentrically mounted gear 48 rises, as shown in FIGURE 4, the idler gear 71, by virtue of pivotal arm 70, maintains its meshed condition therewith by riding upwardly over the periphery of gear 76. The gear 76 is caused to rotate thereby, and the above described gear train effects the rotation of crown gear 98 on counter 90. The diameters and teeth size of the gears described and shown herein will effect 10 revolutions of shaft 96 in a twenty four hour period when the outside temperature is continuously at a —35° F. The tumblers 92 customarily rotate ten times to each rotation of shaft 96, to create a reading of "100" on the counter. Thus, the rotation of idler gear 71 through one-hundredth of a revolution by one of the one hundred teeth in gear 48, and repeated twice an hour for a twenty-four hour period, would result in a reading of "1" degree day on counter 90, and a sensed temperature of 64° F. would normally be indicated. The idler gear and drive gear 48 would only be instantaneously engaged in such a situation, for the Bourdon tube would have lifted the idler gear to almost an inaccessible position by the drive gear 48 at this temperature just below 65° F. At 65° F., the idler gear 71 would be lifted beyond any engagement with the drive gear 48, as contrasted to constant engagement at 35° F. The temperature is sampled by the drive gear twice each hour and at a constant —35° F., 100 degree days will be recorded. As the idler gear 71 is lifted "one degree" of temperature by the Bourdon tube, one tooth on the drive gear 48 will fail to engage idler gear 71, and if these conditions prevailed for twenty-four hours, only 99 degree days would be recorded. In practice, the Bourdon tube will continually move the idler arm 70 and idler gear 71 upwardly and downwardly throughout the period of operation, and the drive gear 48 will rotate the idler gear 71 as it can, with the cumulative revolutions being imposed on shaft 96 being reflected by the counter 90.

Obviously, by reversing the position of the Bourdon tube so that the idler gear would be "lowered" upon an increase in outside temperature, the device would function and record a higher reading as the temperature sensed by coil 66 increased. Such an adaptation would serve to measure "heat" and would be valuable in providing data for use in the air conditioning field.

Thus from the foregoing, it is seen that this invention will accomplish at least all of its stated objectives.

Some changes may be made in the construction and arrangement of my method and means for measuring degree days without departing from the real spirit and purpose of my invention, and it is my intention to cover by my claims, any modified forms of structure or use of mechanical equivalents which may be reasonably included within their scope.

I claim:
1. In a measuring device of the class described,
   a supporting means,
   a temperature responsive means on said supporting means,
   said temperature responsive means including a shaft adapted to undergo a predetermined amount of rotational displacement upon a predetermined and corresponding change in temperature,
   a limiting arm means fixed to said shaft to rotate therewith,
   an idler arm movably connected to said supporting means,
   an idler gear on said idler arm,
   said idler arm being operatively movably connected to said limiting arm means so that the lower position and displacement of said idler arm and idler gear will be determined by the position and displacement of said limiting arm means,
   a power shaft on said supporting means,
   means for powering said power shaft,
   a gear eccentrically mounted on said power shaft and positioned to intermittently mesh with said idler gear between the extreme rotational positions of said idler arm,
   a counter mechanism on said supporting means,
   and connecting means operatively connecting said idler gear and said counter mechanism whereby the proportional rotational displacement of said idler gear by said eccentrically mounted gear will be recorded when said motor is energized.

2. The device of claim 1 wherein means within said temperature responsive limits the rotation of said shaft to less than 180 degrees upon a temperature change of substantially 100 degrees.

3. The device of claim 1 wherein means within said temperature responsive means limits the rotation of said shaft to less than 90 degrees upon a temperature change of substantially 100 degrees.

4. The device of claim 1 wherein said idler arm is rotatably mounted on the shaft of said temperature responsive means.

5. The device of claim 1 wherein said connecting means includes a counter drive gear in constant meshed engagement with said idler gear.

6. The device of claim 1 wherein said connecting means includes a counter drive gear rotatably mounted on the shaft of said temperature responsive means and in constant meshed engagement with said idler gear.

7. The device of claim 1 wherein said temperature responsive means includes a coiled gas filled tube which is in communication with a temperature sensing means that will cause expansion and contraction of said gas and said coiled tube upon temperature changes in the atmosphere around said sensing means.

References Cited by the Examiner
UNITED STATES PATENTS 2,652,724  9/1953  Hidy _____ 73—339

LOUIS R. PRINCE, *Primary Examiner.*

J. RENJILIAN, *Assistant Examiner.*